US012208295B1

(12) United States Patent
Lee et al.

(10) Patent No.: US 12,208,295 B1
(45) Date of Patent: Jan. 28, 2025

(54) WILDFIRE DETECTION SYSTEM

(71) Applicant: CHANG SUNG ACE CO., LTD., Seongnam-si (KR)

(72) Inventors: Yeu Yong Lee, Seongnam-si (KR); Won II Lee, Yongin-si (KR)

(73) Assignee: CHANG SUNG ACE CO., LTD., Seongnam-si (KR)

( * ) Notice: Subject to any disclaimer, the term of this patent is extended or adjusted under 35 U.S.C. 154(b) by 0 days.

(21) Appl. No.: 18/790,367

(22) Filed: Jul. 31, 2024

(30) Foreign Application Priority Data

Nov. 13, 2023 (KR) .................... 10-2023-0156278

(51) Int. Cl.
| | | |
|---|---|---|
| *G06K 9/00* | (2022.01) | |
| *A62C 3/02* | (2006.01) | |
| *G06V 10/143* | (2022.01) | |
| *G06V 10/74* | (2022.01) | |
| *G06V 10/764* | (2022.01) | |
| *G06V 20/10* | (2022.01) | |

(Continued)

(52) U.S. Cl.
CPC .......... *A62C 3/0271* (2013.01); *G06V 10/143* (2022.01); *G06V 10/74* (2022.01); *G06V 10/764* (2022.01); *G06V 20/13* (2022.01); *G06V 20/188* (2022.01); *G06V 20/52* (2022.01); *G08B 17/125* (2013.01)

(58) Field of Classification Search
CPC ........ G06V 20/13; G06V 20/52; G06V 20/44; G06V 10/25; G06V 20/188; G06V 20/17; G06V 20/10; G06V 20/194; G06V 10/764; G06V 20/176; G06V 10/143; G06V 20/41; G06V 10/42; G06V 10/803; G06V 10/814; G06V 20/182; G06V 10/12; G06V 10/147; G06V 10/16; G06V 10/20; G06V 10/751; G06V 10/82; G06V 20/40; G06V 20/46; G06V 40/162; G06V 40/70; G06T 2207/30181; G06T 2207/10032; G06T 2207/30244; G06T 7/70; G06T 7/73; G06T 7/20; G06T 2207/10048; G06T 2207/20081; G06T 2207/30188; G06T 3/4053
See application file for complete search history.

(56) References Cited

U.S. PATENT DOCUMENTS

| | | | |
|---|---|---|---|
| 10,045,187 B1* | 8/2018 | Soleimani | H04W 4/90 |
| 11,295,131 B1* | 4/2022 | Dhawan | G08G 5/0069 |

(Continued)

FOREIGN PATENT DOCUMENTS

| | | | |
|---|---|---|---|
| KR | 10-2014-0093840 A | 7/2014 | |
| KR | 102016245 B1 | 8/2019 | |

(Continued)

OTHER PUBLICATIONS

"Request for the Submission of an Opinion" Office Action issued in KR 10-2023-0156278; mailed by the Korean Intellectual Property Office on Feb. 5, 2024.

(Continued)

*Primary Examiner* — Alex Kok S Liew
(74) *Attorney, Agent, or Firm* — Studebaker & Brackett PC

(57) ABSTRACT

Proposed is a wildfire detection system that accurately detects a fire by using a visible image camera module and a thermal image camera module such that it is possible to quickly respond and cope when a forest fire occurs.

2 Claims, 13 Drawing Sheets

(51) Int. Cl.
    *G06V 20/13*     (2022.01)
    *G06V 20/52*     (2022.01)
    *G08B 17/12*     (2006.01)

(56) References Cited

U.S. PATENT DOCUMENTS 11,308,595 B1 * 4/2022 Wheeler .................... G06T 5/50
2012/0261144 A1 * 10/2012 Vian ..................... G08B 17/125
                                                                         169/43

FOREIGN PATENT DOCUMENTS

KR     10-2023-0080522 A     6/2023
KR     10-2023-0147831 A     10/2023

OTHER PUBLICATIONS

"Written Decision on Registration" Office Action issued in KR 10-2023-0156278; mailed by the Korean Intellectual Property Office on Jun. 25, 2024.

* cited by examiner

FIG.3
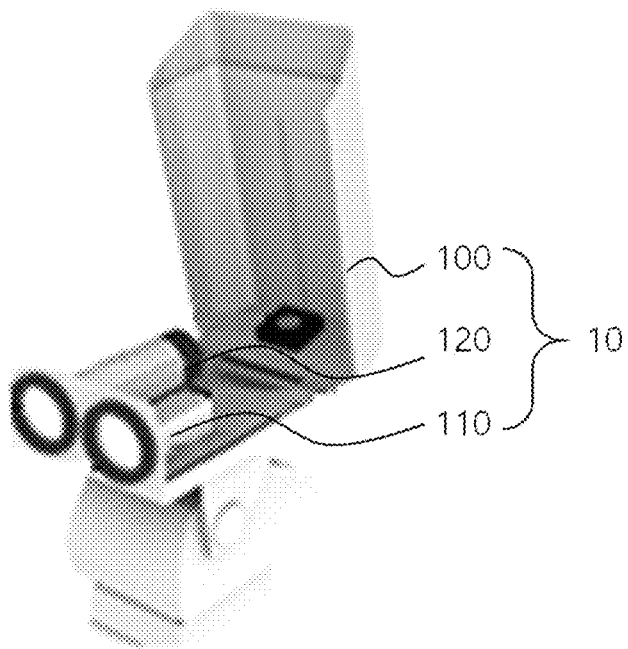
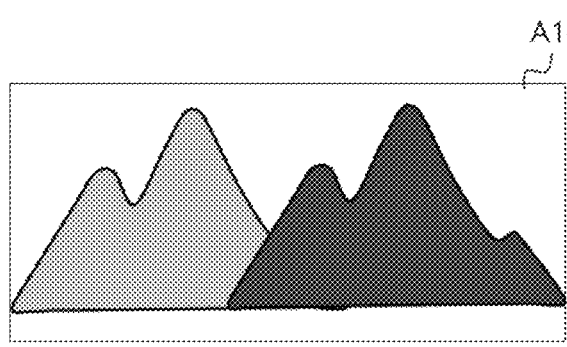
FIG.4A
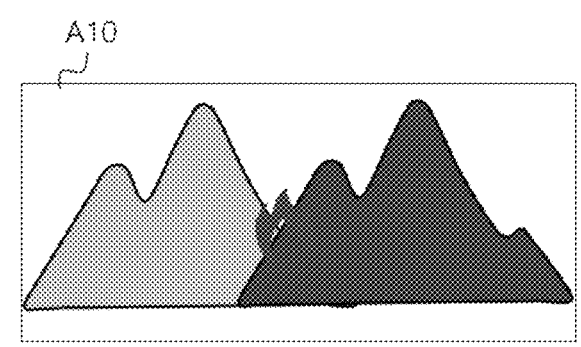
FIG.4B
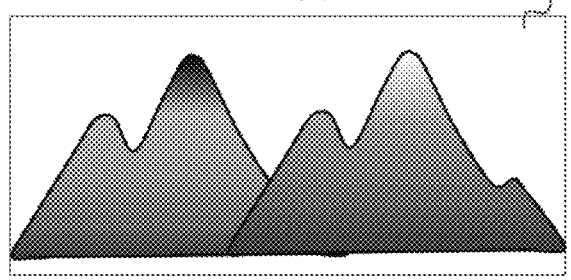
FIG.4C
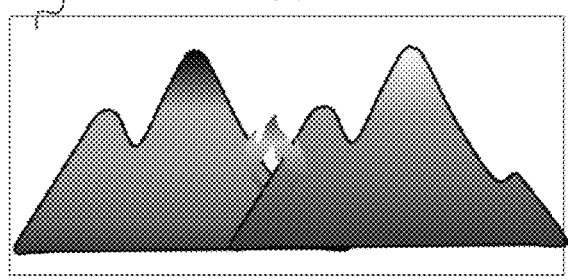
FIG.4D FIG.13
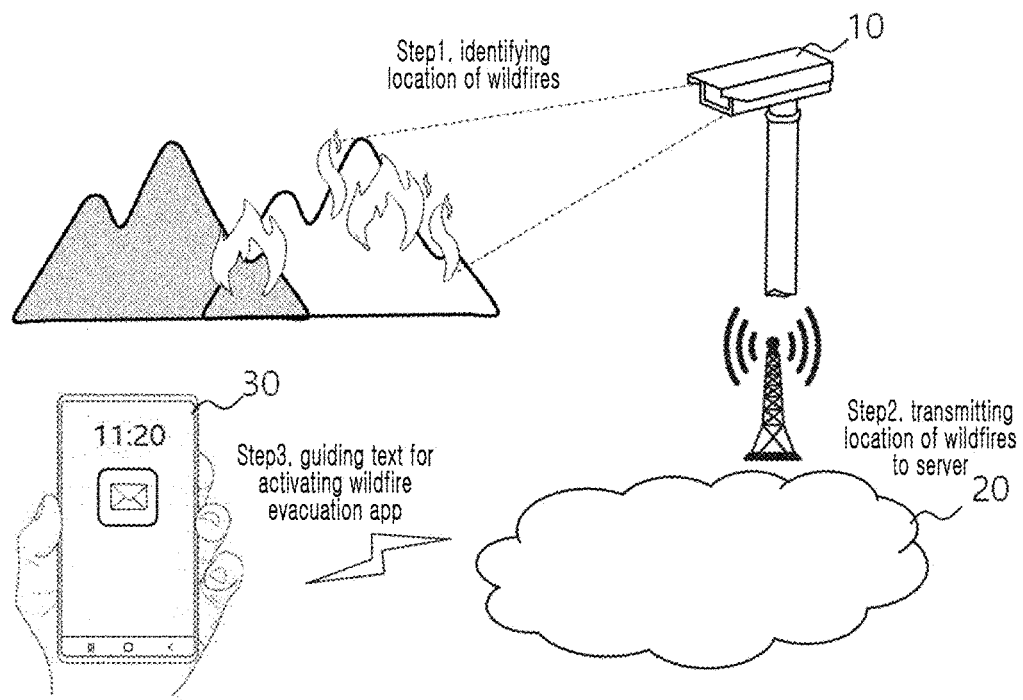
FIG.14A　　　　FIG.14B

WILDFIRE DETECTION SYSTEM

CROSS-REFERENCE TO RELATED PATENT APPLICATION

This application claims the benefit of Korean Patent Application No. 10-2023-0156278, filed on Nov. 13, 2023, in the Korean Intellectual Property Office, the disclosure of which is incorporated herein in its entirety by reference.

TECHNICAL FIELD

The present disclosure relates to a system for detecting a fire.

BACKGROUND ART

The convergence of information and communication technologies such as artificial intelligence (AI), deep learning, and the internet of things, which are driving the 4th industrial revolution, and video security is rapidly increasing. In the past, closed circuit television (CCTV) was only used for prevention of crimes, but in recent years closed circuit television has been integrated with artificial intelligence technology and has been expanded into a device that can prevent accidents.

Among these, one technology that is gaining attention is a fire detection system that detects fire. When detecting flames and sparks, which the system has been trained in advance to detect, the fire detection system provides the detected flames to a monitoring agent, thereby making efficient monitoring possible.

Currently, many of the developed fire detection systems have problems of not accurately detecting a fire and not excluding false fires.

Accordingly, when a fire breaks out in a mountain, it is not possible to accurately predict the exact occurrence of the fire and the progress speed of the fire such that the forest fire cannot be suppressed in the early stage, thereby resulting in damage.

[Related Art Document] Korean Patent Application Publication No. 10-2023-0147831 (Published on Oct. 24, 2023)

DISCLOSURE

Technical Problem

The present disclosure is to solve the problem of a forest fire not being suppressed in the early stage when the forest fire occurs because of failing both to accurately detect the fire and to exclude false fires, using a visible image camera module and a thermal image camera module.

The problems that the present disclosure seeks to solve may not be limited to those mentioned above, and other technical problems not mentioned will be clearly understood by those skilled in the art from the following description.

Technical Solution

The wildfire detection system of the present disclosure to achieve the problem to be solved above includes a camera unit that is composed of a visible image camera module that photographs a certain area and then generates a first video image, and of a thermal image camera module that photographs the same area as the area photographed by the visible image camera module and then generates a second video image, and a main server unit that is provided with an object classification extraction module, wherein a pre-set reference flame object is included, the first video image and the second video image are received from the camera unit, a first video extraction flame object matching a pre-set reference flame object is detected in the first video image, an area that does not match the reference flame object is detected as a first video extraction background object, a second video extraction flame object matching a pre-set reference flame object is detected in the second video image, and an area that does not match the reference flame object is detected as a second video extraction background object, a temperature extraction module that extracts a temperature of the second video extraction flame object at a location that overlaps with the first video extraction flame object detected in the object classification extraction module, and a fire sensing module where a fire signal is generated when at least one of the temperatures extracted from the temperature extraction module is greater than a pre-set fire reference temperature and a non-fire signal is generated when both a temperature extracted from the first video extraction flame object and a temperature extracted from the second video extraction flame object are less than the fire reference temperature.

The main server unit includes a fire location extraction module that extracts in the first video image and the second video image a location information of an area where the first video image and the second video image are photographed when the fire signal is generated in the fire sensing module.

The main server unit includes a notification alarm module that outputs a pre-set message when the fire signal is generated, and a shelter location check module in which a location information of at least one shelter is pre-stored.

A wireless terminal unit is further included for installing a fire evacuation app, communicating data with the main server unit, and receiving a message from the notification alarm module of the main server unit.

The fire evacuation app includes a map image, and displays on the map image a location of the wireless terminal and a location of the shelter received from the shelter location check module when the wireless terminal is turned on after receiving the message from the notification alarm module.

The main server unit further includes a computation module that calculates a vegetation data including a vegetation index and a canopy temperature by receiving data observed from a satellite while communicating data with the satellite and calculates a soil moisture data by receiving a brightness temperature or a backscattering coefficient observed through a microwave sensor installed in the satellite, a variable data receiving module that receives a wind data at a location corresponding to a location information extracted from the fire location extraction module while communicating data with the satellite and receives the vegetation data and the soil moisture data calculated in the computation module, a movement route generation module that generates a plurality of routes from the location of the wireless terminal unit to the location of the shelter and transmits the same to the wireless terminal unit, and a fire spread route extraction module that extracts an estimated route through which a fire spreads in the fire location extraction module through an inner product calculation value of a soil spread potential index and a wind spread potential index by calculating the soil spread potential index, which indicates a degree of likelihood that the fire of a set section spreads, by inputting the vegetation data and the soil moisture data received from the variable data receiving module into the vegetation data/soil moisture data formula and by calculating the wind spread potential index by performing a vector product operation on the wind data with the location information extracted from the fire location extraction module.

The main server unit detects as a fire avoidance movement route a movement route whose wind spread potential index is small among a plurality of movement routes generated in the movement route generation module, that does not overlap with the estimated route generated in the fire spread route extraction module, that has the shortest distance from the wireless terminal unit to the shelter, and transmits the same to the wireless terminal unit.

Advantageous Effects

The present disclosure accurately detects and identifies long-distance fire detection and fire risk factors through an object algorithm so that it is possible to check 24 hours a day whether a fire occurs. Furthermore, the present disclosure zooms in the area in which an object is detected from the segmented areas after segmenting a video image into a plurality of segmented areas, and performs a secondary segmentation again so that it is possible to identify the characteristics of the object. In addition, the present disclosure enables the main server unit to provide people in adjacent to the location of a fire with a safe route to shelter while avoiding the fire's spread route by calculating the location of the pre-set shelter, the movement route data between the fire occurrence location and the shelter, and the movement time according to the movement route, and by calculating the soil moisture data and vegetation data for each movement data route, and wind direction data over time after receiving the location data of the fire occurrence transmitted from the camera unit.

DESCRIPTION OF DRAWINGS

FIG. 3 is a perspective view of a camera unit of FIG. 2.

FIGS. 4A-4D show images generated in a camera unit of the present disclosure.

FIGS. 13 to 16 are views showing an operation state of a wildfire detection system according to an exemplary embodiment of the present disclosure.

BEST MODE

Figure 1:
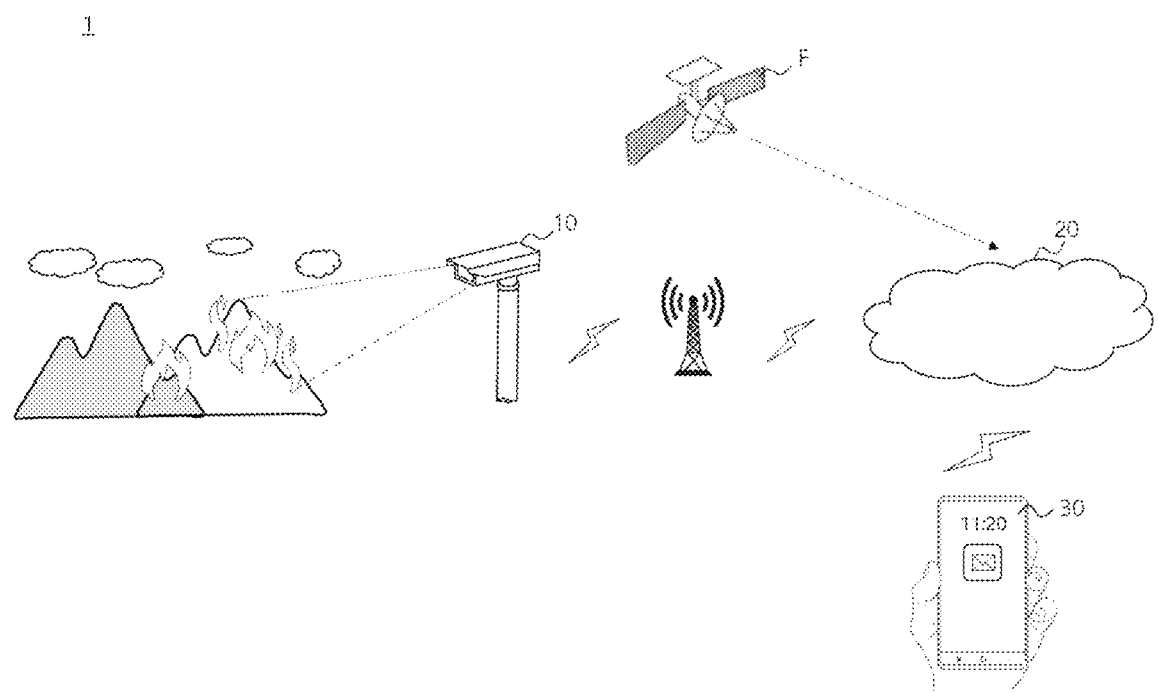
FIG. 1 is a view showing a use state of a wildfire detection system according to an exemplary embodiment of the present disclosure.

Advantages and features of the present disclosure and methods for achieving the same will become clear by referring to the exemplary embodiments described in detail below along with the accompanying drawings. However, the present disclosure may not be limited to the exemplary embodiments disclosed below, but may be implemented in various different forms, and only this exemplary embodiment may be provided to make the present disclosure complete and to fully disclose the scope of the present disclosure to one of ordinary skill in the art to which the present disclosure belongs.

The scope of the present disclosure may be defined by the claims and the description in support of the claims. In addition, the same reference numerals refer to the same elements throughout the specification.

Hereinafter, a wildfire detection system according to an exemplary embodiment of the present disclosure will be described in detail with reference to FIGS. 1 to 16. However, the wildfire detection system will be briefly described with reference to FIG. 1 so that the description of the present disclosure may be concise and clear. Hereinafter, the components constituting the wildfire detection system will be described in detail with reference to FIGS. 2 to 11. Then the operation of the wildfire detection system according to an exemplary embodiment of the present disclosure will be described in detail with reference to the description and FIGS. 12 to 16.

FIG. 1 is a view showing a use state of a wildfire detection system according to an exemplary embodiment of the present disclosure.

Hereinafter, referring to FIG. 1, the wildfire detection system 1 may enable the main server unit 20 to accumulate data on the basis of artificial intelligence technology, to learn the accumulated data and to detect newly introduced and generated objects in the camera unit 10 on the basis of the accumulated data. Then, the detected object may be analyzed and the corresponding data may be transmitted to the wireless terminal unit 30. That is, the wildfire detection system 1 may enable the main server unit 20 to compare the pre-stored data with the object extracted by processing the first video image A10 and the second video image A20 transmitted from the camera unit 10, to detect the characteristics of the object included in the first video image A10 and the second video image A20, and to transmit the same to the wireless terminal unit 30 in order to be utilized as useful information by users. In addition, the wildfire detection system 1 of the present disclosure may zoom in an area, where the object is detected, in order to check whether there is a fire, and may segment the area into a plurality of segmented areas when it is checked as a fire, pulling again an area where the object is detected in the segmented areas for a second segmentation, thereby identifying the characteristics of the object. In addition, the wildfire detection system 1 may enable the main server unit 20 to receive the location data of the fire occurrence transmitted from the camera unit 10 and to calculate the location of the pre-set shelter, the movement route data between the fire occurrence location and the shelter, the movement time according to the movement route, the soil moisture data and vegetation data for the movement data route, and wind direction data over time.

The wildfire detection system 1 may perform computing the characteristics of the object identified in this way and various data, and may provide an optimal route to a shelter to the wireless terminal adjacent to a location where the fire occurs, that is, the wireless terminal unit 30 preset in the main server unit 20, thereby making sure that people are safe and prepared.

Hereinafter, the components that constitute the wildfire detection system will be described in detail with reference to FIGS. 2 to 11.

Figure 2:
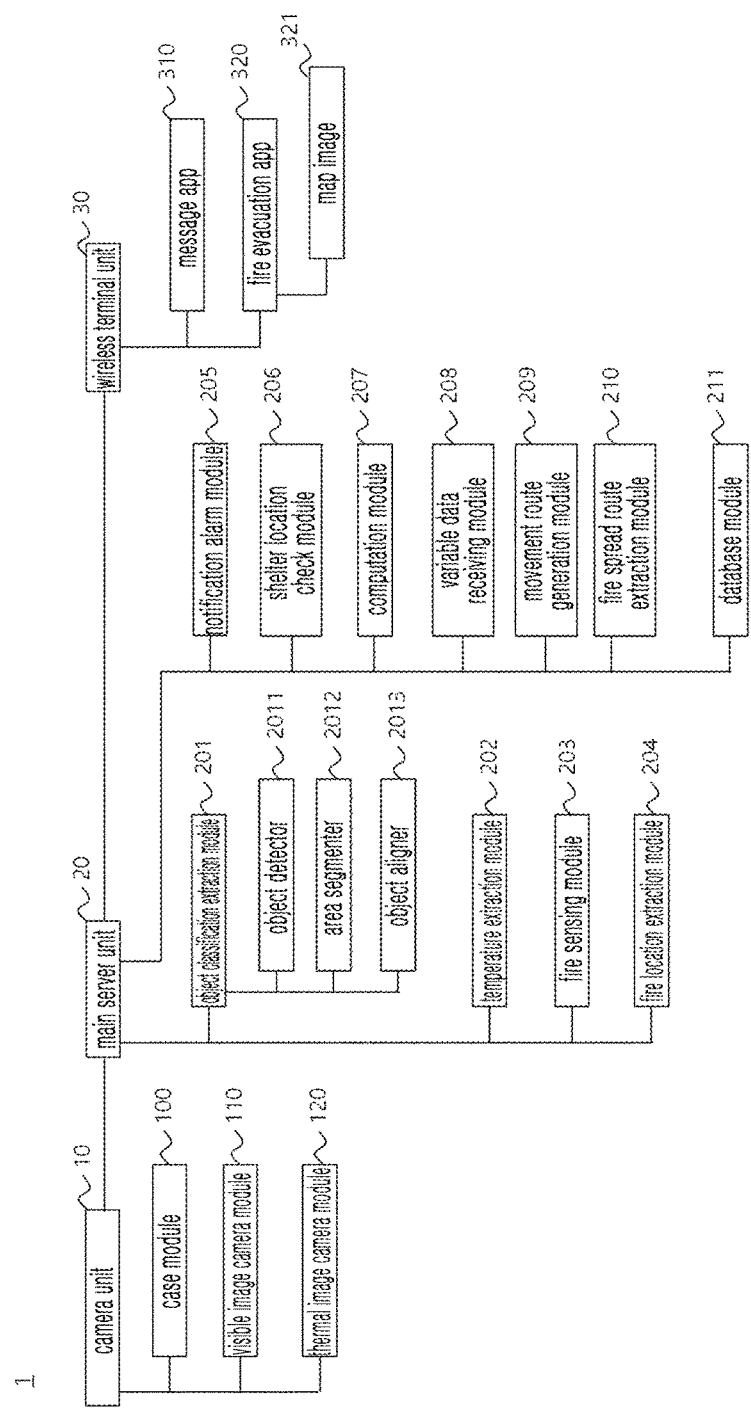
FIG. 2 is a view showing a block diagram of a wildfire detection system according to an exemplary embodiment of the present disclosure.
Figure 5A:
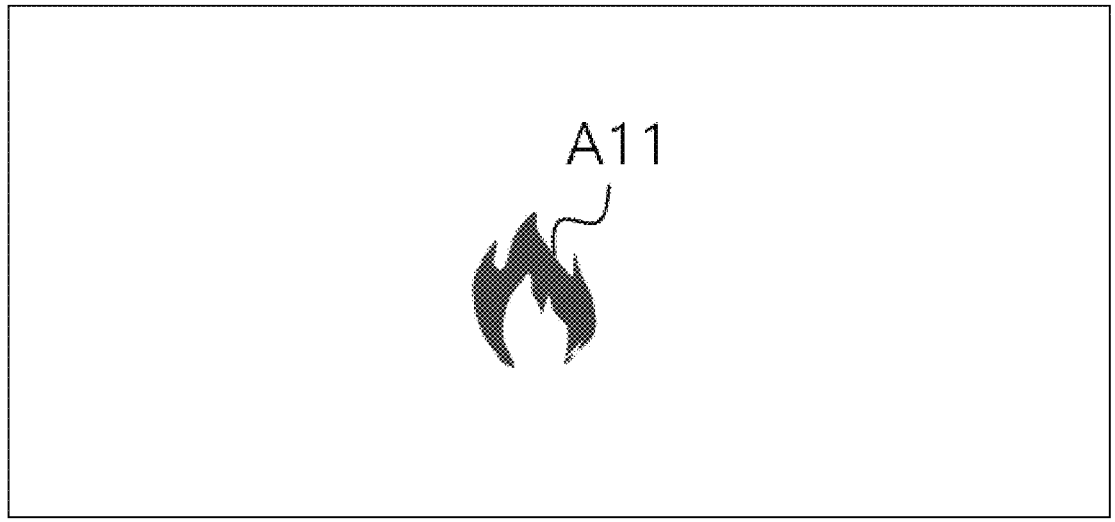
FIGS. 5A and 5B show states in which an object classification extraction module classifies a first video extraction background object and a first video extraction flame object in a first video image.
Figure 5B:
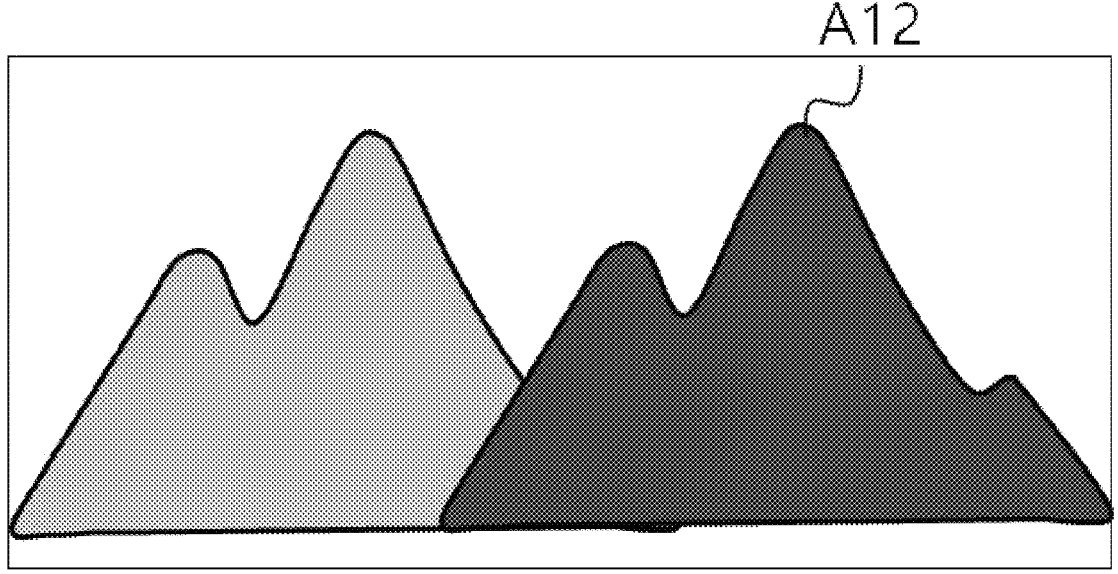
Figure 6A:
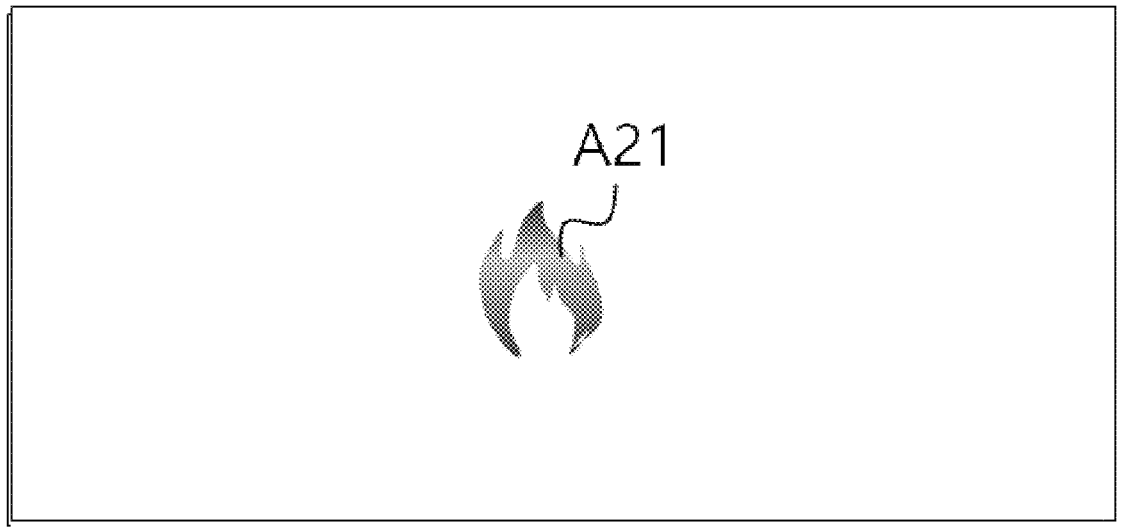
FIGS. 6A and 6B show states in which an object classification extraction module classifies a second video extraction background object and a second video extraction flame object in a second video image.
Figure 6B:
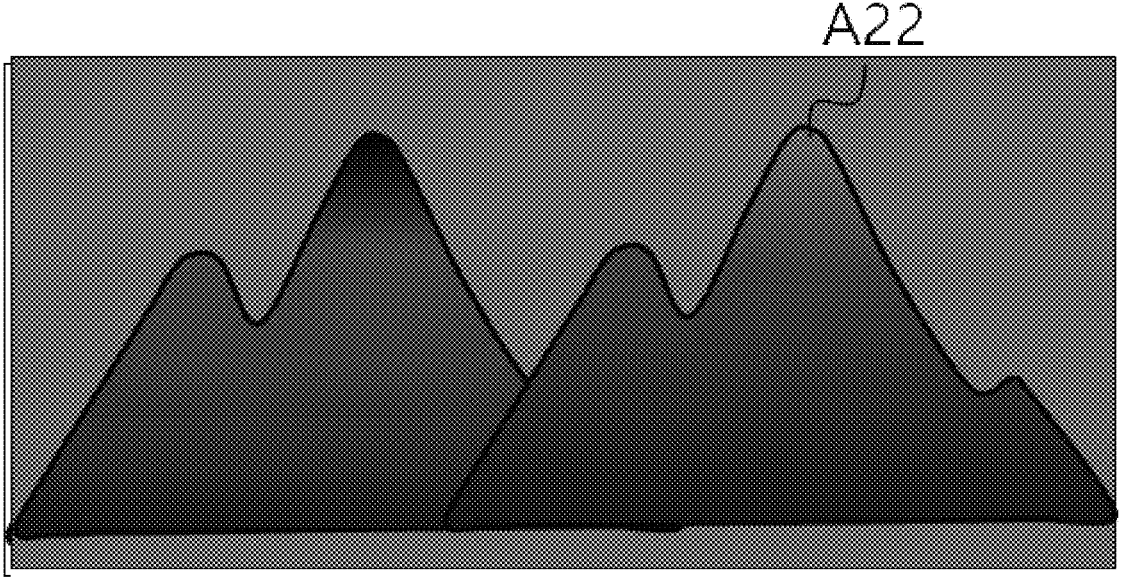
Figure 7:
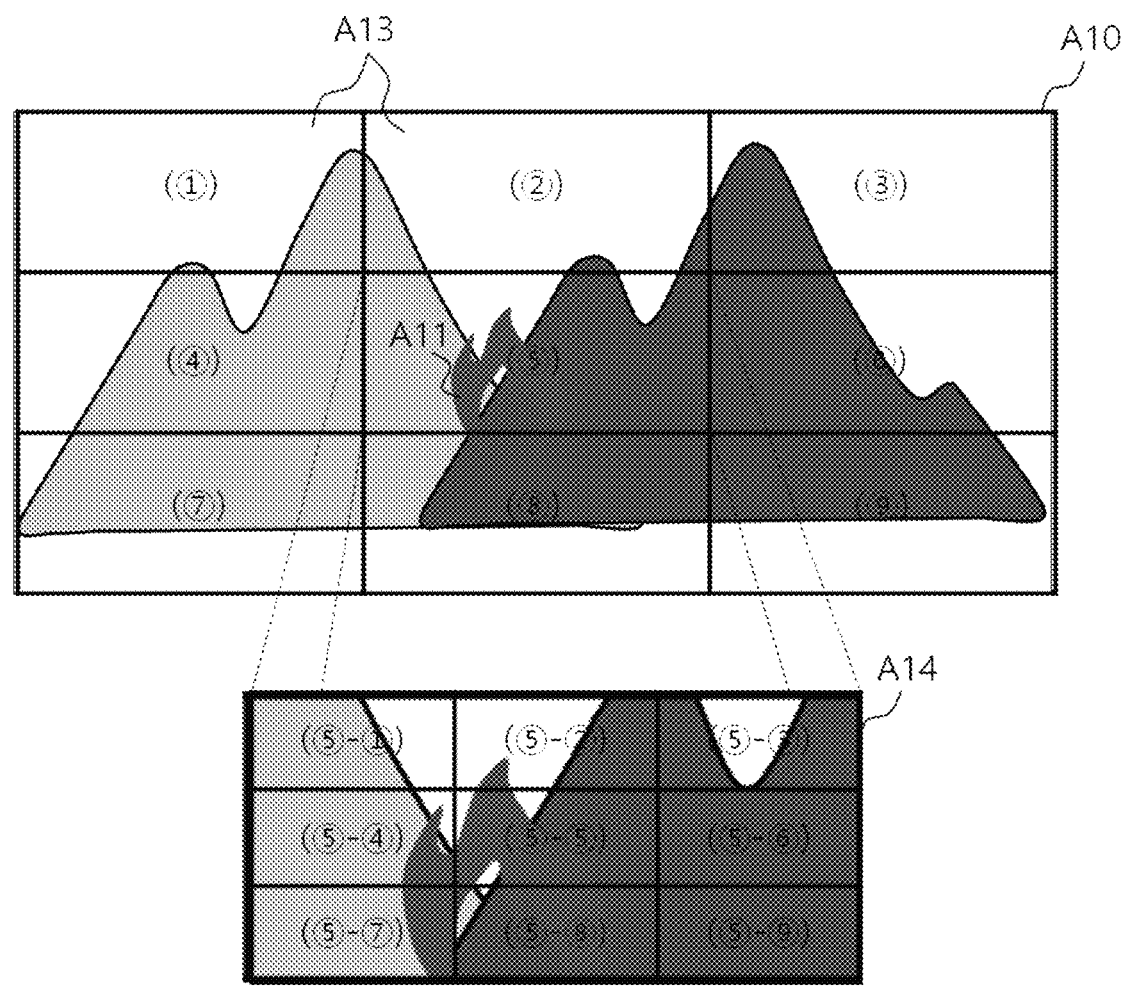
FIG. 7 is a view showing a first split video image where an area segmentation module of FIG. 2 segments a first video image and an enlarged image of the area including a first video extraction flame object in the first split video image.
Figure 8:
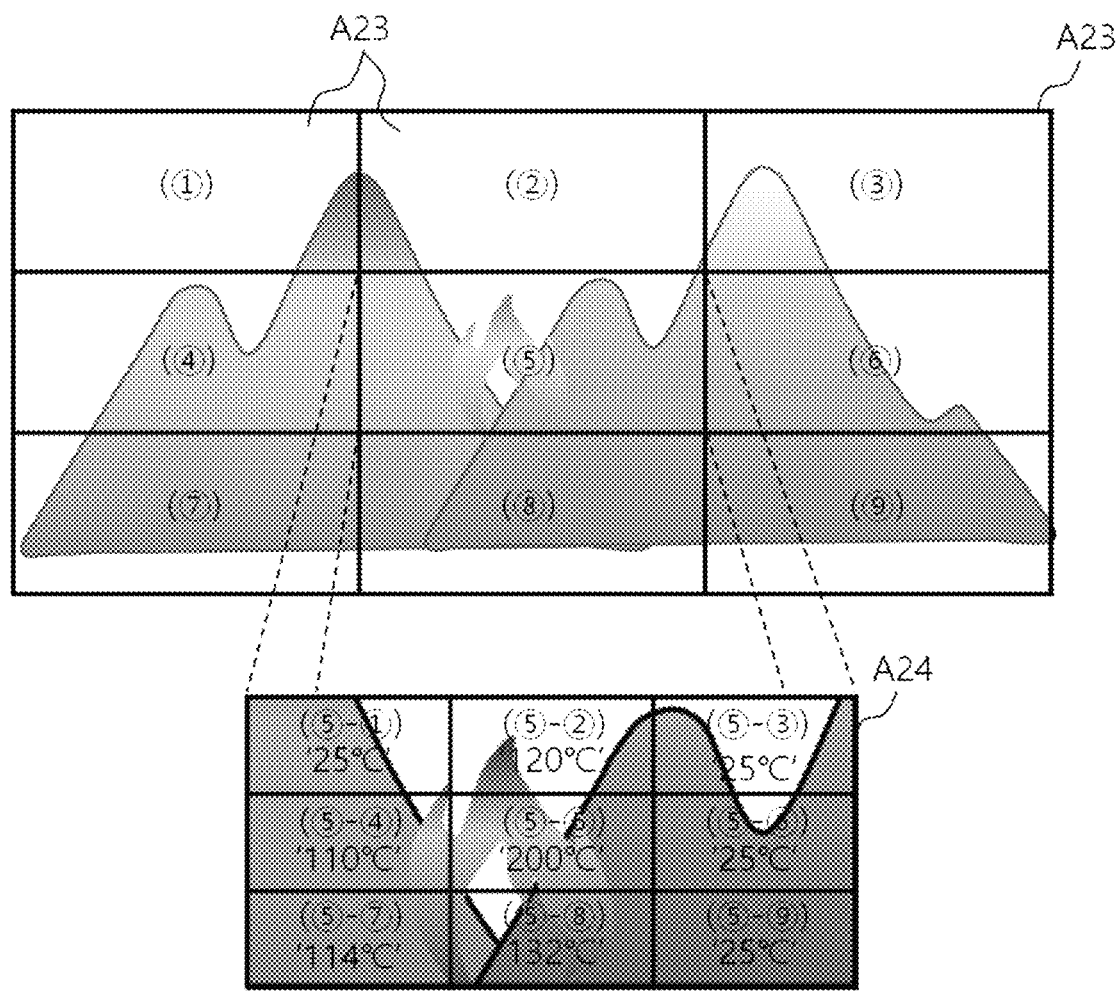
FIG. 8 is a view showing a second split video image where an area segmentation module of FIG. 2 segments a second video image and an enlarged image of the area including a second video extraction flame object in the second split video image.
Figure 9:
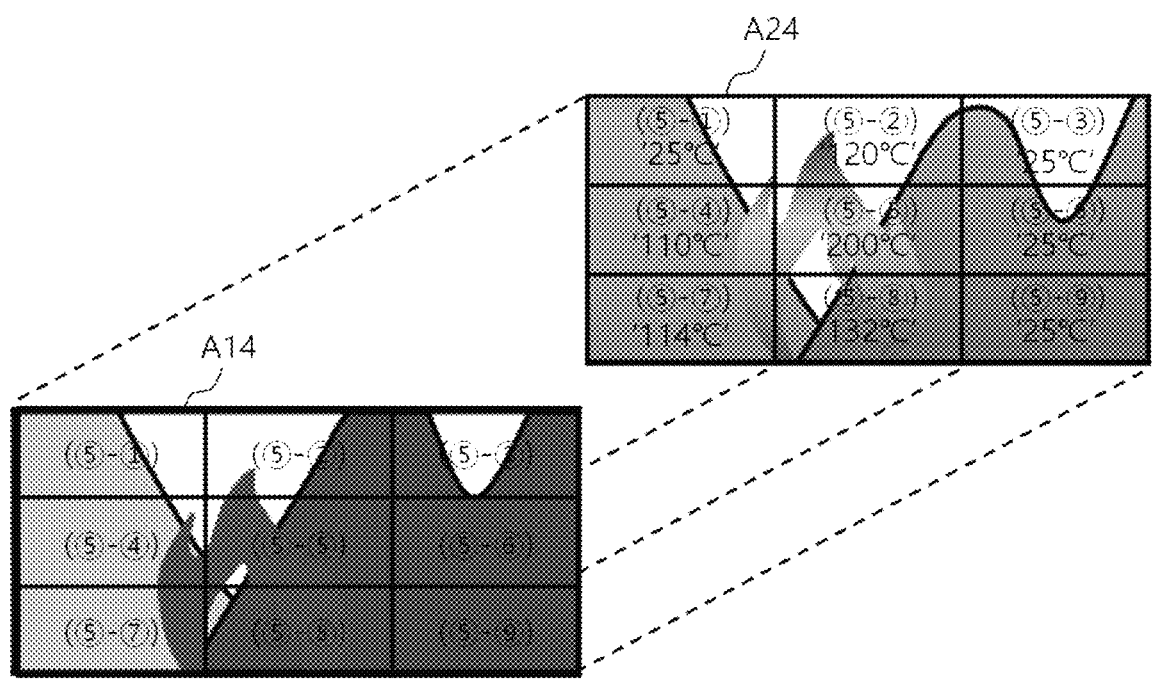
FIG. 9 is a view showing a state in which a synthesis image generation module of FIG. 2 synthesizes a first split video image of FIG. 7 and a second split video image of FIG. 8.
Figure 10A:
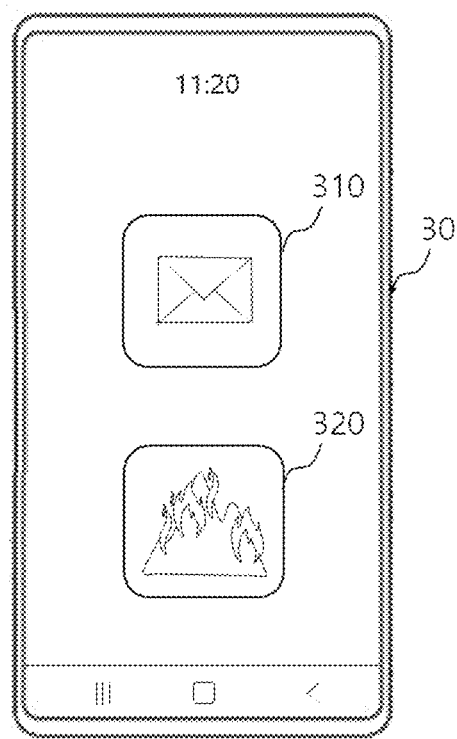
FIGS. 10A and 10B show fire evacuation apps installed on a wireless terminal of FIG. 2 and a map provided by the fire evacuation app.
Figure 10B:
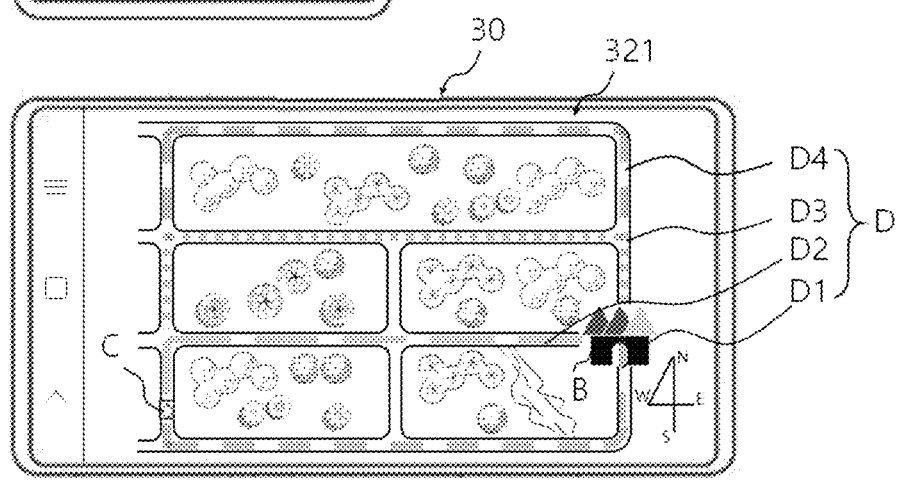
Figure 11A:
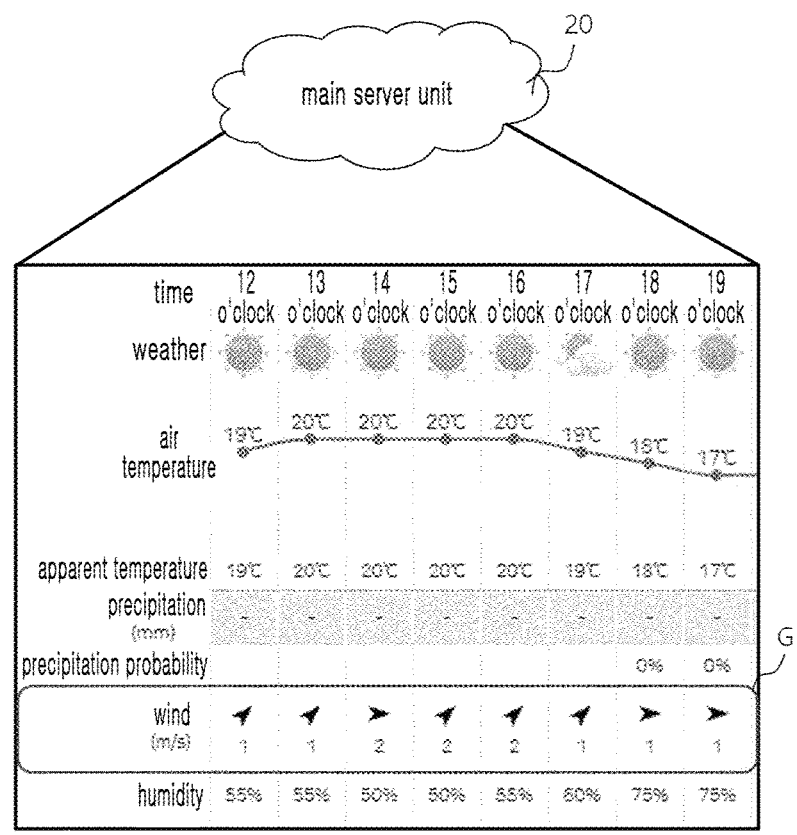
FIGS. 11A and 11B show wind information, vegetation information, soil moisture information, and the like included in a main server unit of FIG. 3.
Figure 11B:
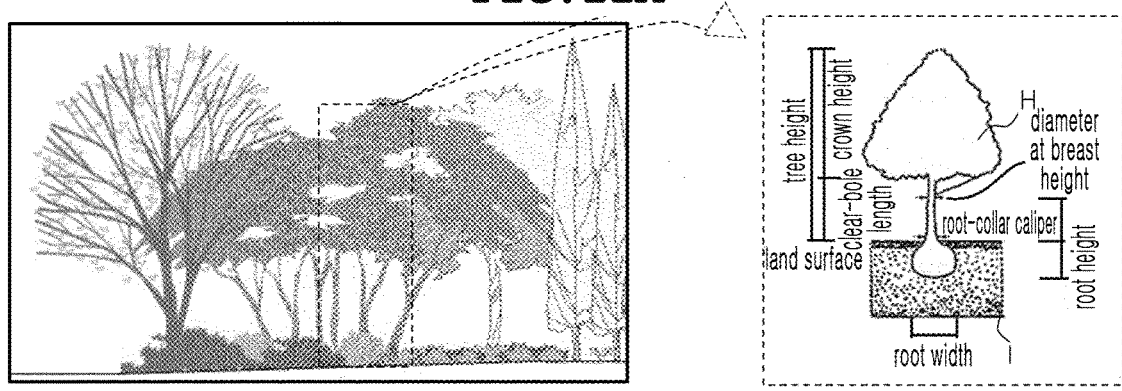

FIG. 2 is a view showing a block diagram of a wildfire detection system according to an exemplary embodiment of the present disclosure, FIG. 3 is a perspective view of a camera unit of FIG. 2., FIGS. 4A-4B show images generated in a camera unit, FIGS. 5A and 5B show states in which an object classification extraction module classifies a first video extraction background object and a first video extraction flame object in a first video image, FIGS. 6A and 6B show states in which an object classification extraction module classifies a second video extraction background object and a second video extraction flame object in a second video image, and FIG. 7 is a view showing a first split video image where an area segmentation module of FIG. 2 segments a first video image and an enlarged image of the area including a first video extraction flame object in the first split video image. FIG. 8 is a view showing a second split video image where an area segmentation module of FIG. 2 segments a second video image and an enlarged image of the area including a second video extraction flame object in the second split video image, FIG. 9 is a view showing a state in which a synthesis image generation module of FIG. 2 synthesizes a first split video image of FIG. 7 and a second split video image of FIG. 8, and FIGS. 10A and 10B show fire evacuation apps installed on a wireless terminal of FIG. 2 and a map provided by the fire evacuation app. FIGS. 11A and 11B show wind information, vegetation information, soil moisture information, and the like included in a main server unit of FIG. 3.

Such a wildfire detection system 1 may include a camera unit 10, a main server unit 20, and a wireless terminal unit 30 as components.

The camera unit 10 may photograph a certain area from a place installed by the user, such as a building or a forest. Then, while photographing the certain area, a thermal image, that is, a first video image A10 and a visible image, that is, a second video image A20 may be generated in response to the corresponding area. As shown in FIG. 3, such a camera unit 10 may include a case module 100, a visible image camera module 110 that is installed inside the case module 100 to generate the first video image A10 while photographing the outside and a thermal image camera module 120 that is installed next to the visible image camera module 110 inside the case module 100 to generate a second video image A20 while photographing the outside. The camera unit 10 may be capable of detecting an incipient fire measuring 70 cm (width)×70 cm (length)×5 cm (height) within 9 seconds at a straight line distance of 5,000 m and of detecting an incipient fire over a large area, up to 10,000 meters in the foreground. The first video image A10 photographed by such a camera unit 10 may be an image generated by the CCD image sensor, and may be an image where a mountain is photographed as shown in FIG. 4A, and may be an image photographed when a fire occurs in the corresponding mountain, as shown in FIG. 4B. The second video image A20 may be a thermal image that visualizes the infrared radiation emitted by the subject. In other words, the second video image A20 may be an image in which heat of objects and areas are visualized, and that allows high heat sources such as fire to be identified through heat distribution. In this case, the thermal image may be a thermal image where a mountain is photographed as shown in FIG. 4C, and may be a thermal image photographed when a fire occurs in the corresponding mountain, as shown in FIG. 4D.

Likewise, both the first video image A10 and the second video image A20 may be images where the same area is photographed. The camera unit 10 may transmit the first video image A10 and the second video image A20 in real time to the main server unit 20 connected to the wireless network.

The location of such a camera unit 10 may be controlled by data transmitted from the main server unit 20.

Accordingly, the camera unit 10 may photograph areas with a high fire risk as targets of intensive management depending on local conditions. In addition, the latitude and longitude transmitted from the main server unit 20 may be received up to 10 locations and be monitored in order from the farthest to the nearest. In this case, the camera unit 10 may set a plurality of arbitrary reference locations in the surveillance area, accurately receive the longitude and latitude for each specified reference location, compare the measured distance of the fire occurrence with the actual distance to identify errors in the measured data, and photograph a certain area to generate the first video image A10 and the second video image A20 while correcting the occurrence location.

By applying YOLO's object detection technology, which detects the locations of several objects in the video, the main server unit 20 may collect a fire or non-fire image data, convert the data on the basis of the YOLO model by labeling and pre-processing (size, normalization) as fire and non-fire, and build a deep learning model based on the YOLO algorithm to proceed with learning. In addition, by processing the first video image A10 and the second video image A20 transmitted from the camera unit 10, the main server unit 20 may detect a flame object in the first video image A10 and the second video image A20 and transmit the same to the wireless terminal unit 30.

The main server unit 20 may include an object classification extraction module 201, a temperature extraction module 202, a fire sensing module 203, a fire location extraction module 204, a notification alarm module 205, and a shelter location check module 206.

The object classification extraction module 201 may include a pre-set reference base object and a pre-set reference flame object and receive the first video image A10 and the second video image A20 from the camera unit 10. The object classification extraction module 201 may include an object detector 2011, an area segmenter 2012, and an object aligner 2013 and more accurately classify base objects (A12, A22) and flame objects (A11, A11) in the received first video image A10 and the second video image A20.

Hereinafter, it may be described in detail that the object classification extraction module 201 detects a video extraction base object and a video extraction flame object in the first video image A10 and the second video image A20 through the object detector 2011 and the area segmenter 2012.

The object detector 2011 may perform a frame segmentation that segments a video into frame units for fire detection, a flame object extraction that accurately extracts the background by removing dynamic elements (such as moving objects other than fires) from the video, and a color space conversion to convert RGB to HSV, LAB, and other color spaces to utilize color information. In addition, the object detector 2011 may detect an object that matches a pre-set reference flame object in the first video image A10, calculate a matching value between the detected object and the reference flame object, and classify the detected object as a flame object when the matching value exceeds a reference value. An object that is not classified as a flame object or an object that matches a pre-set reference base object may be detected, and a matching value between the detected object and the reference base object may be calculated to classify the detected object as a base object when the matching value exceeds a reference value. For example, the object detector 2011 may detect a first video extraction flame object A11 that matches a pre-set reference flame object in the first video image A10 as shown in FIG. 5A. In addition, as shown in FIG. 5B, the first video extraction background object A12 that matches the pre-set reference base object in the first video image A10 or an object that does not match the reference flame object may be detected as the first video extraction background object A12. In addition, the object detector 2011 may detect a second video extraction flame object A21 that matches the pre-set reference flame object in the second video image A20 as shown in FIG. 6A. As shown in FIG. 6B, the second video extraction background object A22 that matches the pre-set reference base object in the second video image A20 or an object that does not match the reference flame object may be detected as the second video extraction background object A22. At this time, the reference background object and the reference flame object stored in the object classification extraction module 201 may not be limited to the mountain shape and flame shape shown in FIGS. 5A-6B, but may be an object including various shapes of mountains and flames.

The area segmenter 2012 may segment the first video image A10 and the second video image A20 into a plurality of segmentation areas. For example, the area segmenter 2012 may segment the first video image A10 into 3×3 to generate a first split video image A13, and may segment the second video image A20 into 3×3 to generate the second split video image A23. In this case, the first split video image A13 and the second split video image A23 may include a first segmentation area (①) 1 to a ninth segmentation area (⑨), as shown in FIGS. 7 and 8. In addition, after enlarging an area that includes the object detected by the object detector 2011, the area segmenter 2012 may secondly segment the area into 3×3 and then generate a part of the first split video image A13 as a first split part enlargement image A14, and a part of the second split video image A23 as a second split part enlargement image A24.

The object aligner 2013 may align the first video extraction flame object A11 and the first video extraction background object A12 classified in the visible image A10, and the second video extraction flame object A21 and the second video extraction background object A22 classified in the thermal image A20 so that the first video extraction flame object A11 and the second video extraction flame object A21 overlap each other.

The object classification extraction module 201 may enable the location of the first video extraction flame object to be accurately identified in the first video image A10 and enable the temperature extraction module 202 to accurately extract the temperature of the second video extraction flame object A21 that overlaps with the first video extraction flame object.

The temperature extraction module 202 may extract the temperature of the second video extraction flame object A22 at a location that overlaps with the first video extraction flame object A11 detected in the object classification extraction module 201. Moreover, the temperature extraction module 202 may extract the maximum and minimum temperature values in the second video extraction flame object A22 through temperature analysis and a set threshold value, and determine whether there is a fire by comparing with a pre-set fire reference temperature arbitrarily set when the temperature rises due to a fire. For example, the temperature extraction module 202 may extract the temperature of a first split part enlargement area (⑤)-(①) of the second split part enlargement image A24 as 25° C., the temperature of a second split part enlargement area ⑤-② as 120° C., and the temperature of a third split part enlargement area ⑤-③ as 25° C. as shown in FIG. 9. The temperature of a fourth split part enlargement area ⑤-④ may be extracted as 110° C., the temperature of a fifth split part enlargement area ⑤-⑤ may be extracted as 200° C., and the temperature of a sixth split part enlargement area ⑤-⑥ may be extracted as 25° C. In addition, the temperature of a seventh split part enlargement area (⑤-⑦) may be extracted as 114° C., the temperature of an eighth split part enlargement area (⑤-⑧) may be extracted as 132° C., and the temperature of a ninth split part enlargement area (⑤-⑨) may be extracted as 25° C.

The object classification extraction module 201 may include the object detector 2011, the area segmenter 2012, and the object aligner 2013 to accurately identify the occurrence of a fire, and may enable to accurately identify the location of the fire when it is determined that there is a fire. In addition, the temperature extraction module 202 may accurately determine the temperature of a portion of the flame object identified in the object classification extraction module 201.

The fire sensing module 203 may generate a fire signal when the temperature of at least one of the temperatures extracted by the temperature extraction module 202 is greater than a pre-set fire reference temperature. A non-fire signal may be generated when both the temperature extracted from the first video extraction flame object A11 and the temperature extracted from the second video extraction flame object A22 are smaller than the fire reference temperature. For example, the fire sensing module 230 may generate a fire signal when the temperature of any one of the split part enlargement areas from the first split part enlargement area ⑤-① to the first split part enlargement area ⑤-① is greater than the fire reference temperature while a non-fire signal is generated when all temperatures from the first split part enlargement area ⑤-① to the first split part enlargement area ⑤-① of the second split part enlargement image A24 are smaller than the fire reference temperature as shown in FIG. 9.

When a fire signal is generated in the fire sensing module 203, the fire location extraction module 204 may extract from the first video image A10 and the second video image A20 a location information of an area where the first video image A10 and the second video image A20 are photographed. For example, the location information of the first video extraction flame object A11 or the second video extraction flame object A21 may be extracted through the location information of the camera unit 10 installed in a certain area, the location area photographed by the camera unit 10, and the location information identified by the object classification extraction module described above.

When a fire signal is generated in the fire detection module 203, the notification alarm module 205 may output a pre-set message. Herein, the message may be a message having the content of "There is a fire at location xx, please turn on the fire evacuation app" in the wireless terminal unit 30.

The shelter location check module 206 may include location information of at least one shelter (B). The shelter location check module 206 may pre-store location information of a first shelter and a second shelter located near a first location, and location information of a third shelter and a fourth shelter located near a second location.

The wireless terminal unit 30 may transmit and receive data to and from the main server unit 20 through wireless communication, and become a terminal on which various applications can be installed. As shown in FIG. 10A, a message app 310 and a fire evacuation app 320 may be installed in the wireless terminal unit 30. Herein, the fire evacuation app 320 may include a map image 321 and display the location of the wireless terminal unit 30 and the location of the shelter (B) received from the shelter location check module 206 in the map image 321 when the wireless terminal unit 30 is turned on after receiving a message from the notification alarm module 205, as shown in FIG. 10B. Furthermore, the fire evacuation application 320 may be operated by a signal transmitted from the main server unit 20.

The map image 321 may show the current location (C) of the wireless terminal unit 30, a shelter (B) located near an area where the fire occurs, and various movement routes (D) from the location of the wireless terminal unit 30 to the shelter (B). More specifically, as shown in FIG. 10b, various movement routes such as a first movement route (D1), a second movement route (D2), a third movement route (D3), and a fourth movement route (D4) may be shown. In addition, when the wireless terminal unit 30 receives data corresponding to a fire avoidance movement route transmitted by the main server unit 20, the fire evacuation app 320 may provide an optimal fire avoidance movement route (E) for the shelter to the user using the wireless terminal unit 30 through data transmitted from the main server unit 20. The fire avoidance movement route data (E) that the wireless terminal unit 30 receives and the fire avoidance movement route (E) displayed in the wireless terminal unit 30 will be described later in detail.

The main server unit 20 may further include a computation module 207, a variable data receiving module 208, a movement route generation module 209, a fire spread route extraction module 210, and a database module 211 as components in order to provide an optimal route for avoiding fire, that is, a fire avoidance movement route (E) to the fire evacuation app 320.

The computation module 207 may communicate data with the satellite (F) to receive data observed from the satellite (F) and calculate vegetation data (H) including a vegetation index and a canopy temperature. In addition, brightness temperature or backscattering coefficients observed through microwaves installed in the satellite (F) may be received to calculate soil moisture data (I).

The variable data receiving module 208 may communicate data with the satellite (F) and receive wind data (G) of a location corresponding to the location information extracted from the fire location extraction module 204. Vegetation data (H) and soil moisture data (I) calculated in the computation module 207 may be received.

The movement route generation module 209 may generate a plurality of movement routes (D) from the location of the wireless terminal unit 30 to the location of the shelter and transmit the same to the wireless terminal unit 30. In this case, the plurality of movement routes (D) may be formed by a combination of various passageways on the basis of a pre-set passageway.

The fire spread route extraction module 210 may receive the wind data (G) received from the variable data receiving module 207, the vegetation data (H) and the soil moisture data (I) calculated in the computation module 207.

An estimated route (J) through which a fire spreads may be extracted by calculating the vegetation data (H) and the soil moisture data (I) using a pre-set formula. For example, the fire spread route extraction module 210 may extract an estimated route (J) generated by stopping and diverting the fire spread route according to the vegetation data (H) and the soil moisture data (I) in a predicted route by predicting that the fire will follow the northwesterly wind and spread to the northwest from the point where the fire started when the northwesterly wind blows. Herein, the wind data (G) may be wind data provided by the meteorological administration. As shown in FIG. 11A, the wind data (G) may become data that reflect directional changes over time and be reflected in the extraction of the estimated route, thereby increasing the reliability of the extracted estimated route. This kind of wind data (G) may be received in real time from the meteorological administration. In addition, vegetation data (H) may be the degree of moisture content of vegetation using data observed from a satellite in order to determine the degree of dryness of vegetation covering the land surface.

As shown in FIG. 11B, the vegetation data (H) may become information on a group of plants growing on the land surface. Such a vegetation data (H) may indirectly have vegetation information of a certain area by using data observed from the satellite. In particular, vegetation data (H) may become data that make it possible to predict the risk of wildfires and possible movement routes of fire, along with information on soil moisture to be described later by identifying the degree of dryness of the vegetation since vegetation covering the land surface contains moisture for growth. The vegetation data (H) may include a vegetation index, a canopy temperature, and the like. In this case, the vegetation index may be an index that emphasizes the characteristic information of vegetation using signals in the wavelength band that is sensitive to vegetation and signals in the wavelength band that is not sensitive to vegetation observed from the satellite. For example, the vegetation index may be a normalized differential vegetation index (NDVI), an enhanced vegetation index (EVI), and the like. Herein, the normalized differential vegetation index (NDVI) may be an index that indicates a high value for bushes with high reflectivity in the near-infrared area and a value close to 0 for soil with little difference between the two reflectance values. Accordingly, the vegetation data (H) may be expressed as a formula including canopy temperature ($T_c$). For example, the vegetation data (H) may be expressed in the formula $T_c=[T_R(\theta)^n-(1-f)T_S^n]/f^{1/n}$. Herein, $T_c$ is a canopy temperature (K), and $T_R$ is a directional surface temperature according to the view angle ($\theta$). The view angle $T_R$ may be expressed in the formula $T_R=\{[T_B(\theta)^n-(1-\varepsilon(\theta))T_{SKY}^n]/\varepsilon(\theta)\}^{1/n}$ Herein, $T_B(\theta)$ is a directional brightness temperature measured at a particular angle $\theta$ by a satellite, and $\varepsilon(\theta)$ is a directional emissivity measured at the view angle θ. $T_{SKY}$ is a hemispherical melting point of the sky (=2.7K), and $T_S$ is the soil surface temperature n=$(C_2/\lambda T_o)*(1+1/\exp(C_2/\lambda T_o)-1)$. Herein, λ is the wavelength of the satellite-mounted sensor, and $C_2$ is $1.4388*10^4$ μmK. $T_o$ is the brightness temperature input to the plank function. f is 1-exp (−0.5LAI/cos ψ). Herein, LAI is Leaf Area Index, and ψ is the view zenith angle by which LAI is measured.

As can be seen from the formula, the directional surface temperature ($T_R$) and the soil surface temperature ($T_S$) according to the view angle may be required in order to calculate the canopy temperature ($T_c$). The directional surface temperature ($T_R$) according to the view angle may be calculated by the formula, and at this time $T_B(\theta)$ is a directional brightness temperature measured by the satellite at a particular view angle (θ). ε(θ) is a directional emissivity measured at the view angle θ, which means the efficiency of energy emission from the surface of an object when radiating heat. $T_{SKY}$ is the hemispherical melting point of the sky, and 2.7K, which is the amount of the black body radiation that fills the universe, is applied. Herein, n may be calculated according to the formula through the Planck function and the wavelength (λ) of a sensor mounted on the satellite that observes the brightness temperature. $T_o$ is the brightness temperature input to the Planck function, and n=1 may be applied in the range of brightness temperature TO=190~315K measured at 21 cm wavelength conditions, that is, λ=210000 μm in the case of the Soil Moisture Active Passive (SMAP) satellite.

The soil moisture data may be data that means the amount of water contained in the soil. Such soil moisture data may be expressed as the volume of water among the total volume of soil, water, and air and may be expressed as %. Such soil moisture data may be calculated on a global scale through satellites. For example, soil moisture data may be data according to soil moisture calculated using brightness temperature obtained through a passive microwave sensor installed on the satellite and backscattering coefficients obtained through an active microwave sensor installed on the satellite.

Such soil moisture data may indirectly identify the moisture contained in the soil and may be utilized as information on the combustibility of vegetation near the land surface along with the vegetation data described above.

The movement route generation module 209 may generate a plurality of movement routes from the location of the wireless terminal unit 30 to the location of the shelter in the wireless terminal unit 30.

The fire spread route extraction module 210 may calculate a soil spread potential index, which indicates the degree of the possibility of fire spreading in a set section, by putting the vegetation data (H) and the soil moisture data (I) received from the variable data receiving module 207 into the formula of the vegetation data/soil moisture data. The soil spread potential index calculated in this way may indicate a high and low risk of wildfire occurrence according to the size of the value. Herein, when the value of the soil spread potential index is greater than or equal to 120K/%, it may be determined that the risk of wildfire occurrence is high. In addition, when the value of the soil spread potential index is less than or equal to 20K/%, it may be determined that the risk of wildfire occurrence is low. In addition, the fire spread route extraction module 210 may calculate a wind spread potential index that scores the possibility of movement according to the wind data by performing a vector product operation on the wind data (G) with the location information extracted from the fire location extraction module 204. In this way, the fire spread route extraction module 210 may calculate the wind spread potential index as data in three-dimensional space by performing vector product calculations. In addition, the fire spread route extraction module 210 may extract an estimated route (J) for the fire to spread in the fire location extraction module 204 by performing an inner product operation on the calculated soil spread potential index and the wind spread potential index. In addition, the fire spread route extraction module 210 may detect as a fire avoidance movement route (K) a movement route having the smallest total spread potential index among the total spread potential indices calculated from a plurality of movement routes and transmit the same to the wireless terminal unit 30. Herein, the soil moisture data, which is a denominator for the formula of vegetation data/soil moisture data, may be a value calculated using the brightness temperature or backscattering coefficients described above, and the vegetation data, which is the numerator, may be the canopy temperature. In this case, the canopy temperature may be a factor indicating the moisture level of the vegetation, and may be calculated in the fire spread route extraction module 210.

The database module 211 may store data observed by the satellite, vegetation information including canopy temperature, soil moisture, and the like. In addition, data observed by the satellite equipped with a microwave sensor may be stored. Of course, database unit 12 may store various data such as geography, weather, vegetation information, and soil moisture and the like in addition to data observed by microwave sensors.

Hereinafter, the operation of the wildfire detection system according to an exemplary embodiment of the present disclosure will be described in detail with reference to FIGS. 12 to 16.

Figure 12:
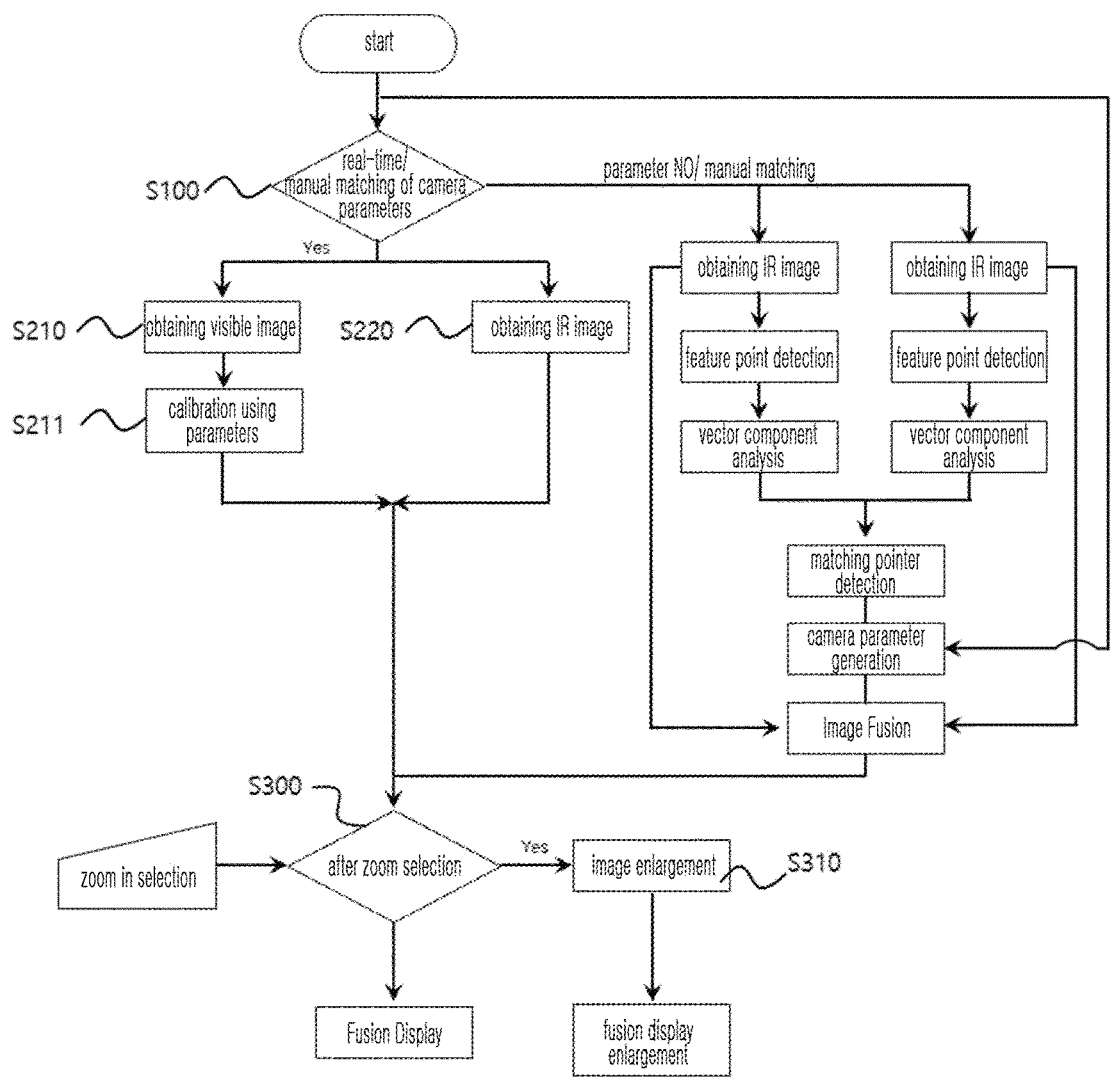
FIG. 12 is a flowchart showing an operation of a wildfire detection system according to an exemplary embodiment of the present disclosure.
Figure 15:
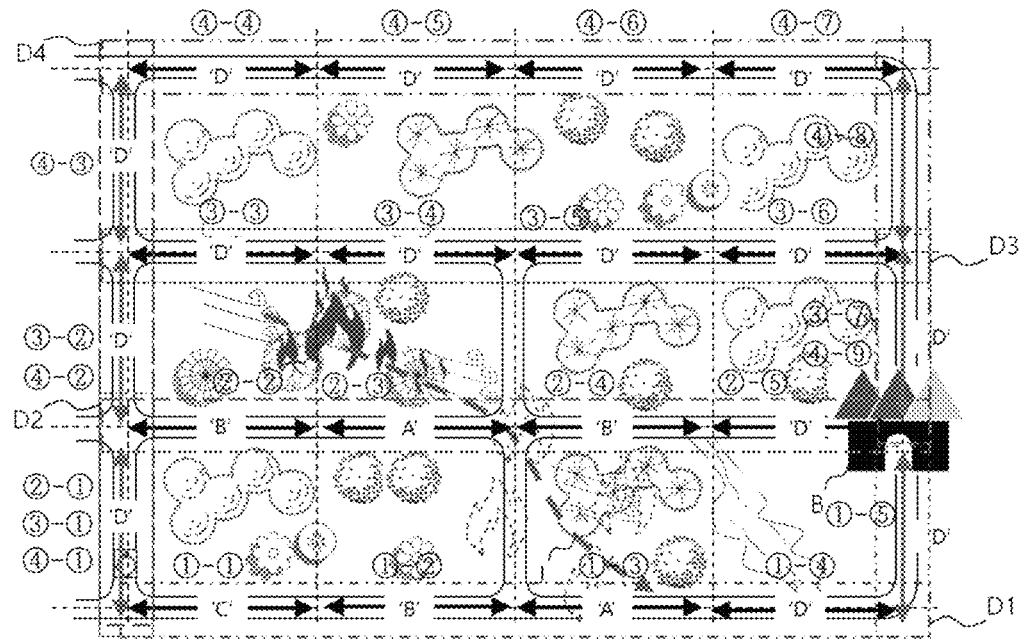
Figure 16:
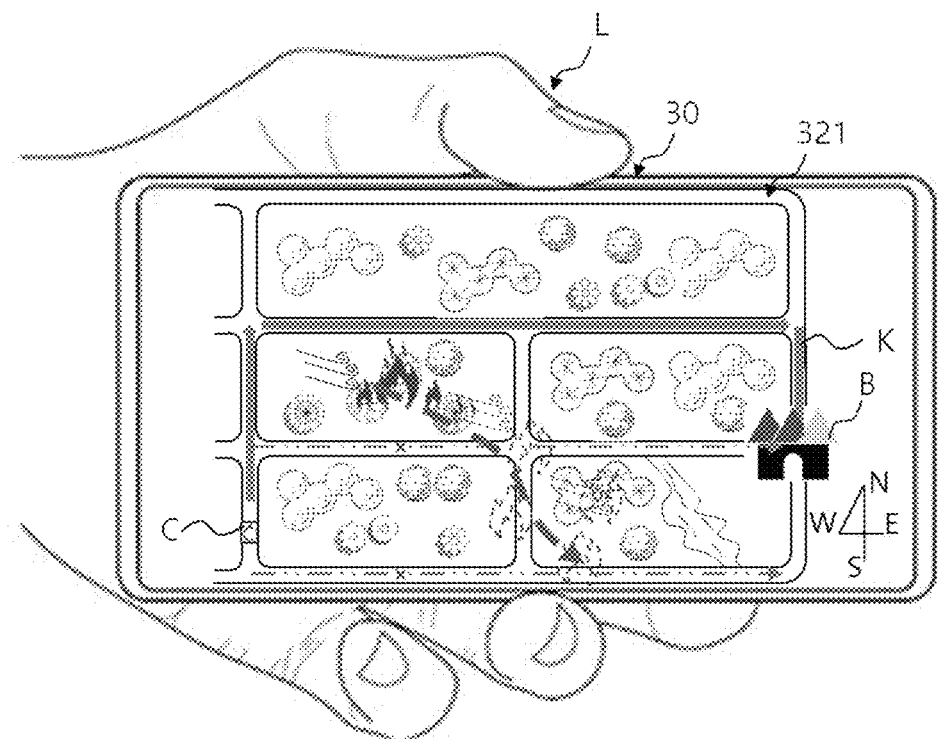

FIG. 12 is a flowchart showing an operation of a wildfire detection system according to an exemplary embodiment of the present disclosure. FIGS. 14 to 16 are views showing an operation state of a wildfire detection system according to an exemplary embodiment of the present disclosure.

The wildfire detection system 1 of the present disclosure may start with obtaining the first video image A10 and a second video image A20 from the camera unit 10, as shown in FIG. 12. An object that matches and does not match the reference flame object may be first detected from the obtained first video image A10 and the second video image A20. When an object that matches the reference flame object is first detected, an area in which the object is detected may be zoomed in to enlarge the object, and then the object may be contrasted with the reference flame object again. In this case, when the enlarged detected object matches the reference flame object more than a reference value, the temperature of the flame object classified in the second video image may be measured to determine whether the object is a flame once again.

As shown in FIG. 13, when the location of the forest fire is identified, the wildfire detection system 1 may generate a fire signal in the main server unit 20 and transmit the same to the wireless terminal unit 30. In this case, a text message guiding the activation of the fire evacuation app may be transmitted to the wireless terminal unit 30.

In this case, when the wireless terminal unit 30 receives a fire signal, the fire evacuation app 320 may be activated by a user as shown in FIG. 14A. When the fire evacuation app 320 is activated, the map image 321 indicating the location of the wireless terminal unit 30 and the location of the shelter received by the shelter location check module 206 may be output as shown in FIG. 14B. In this case, the map image 321 may show the current location (C) of the wireless terminal unit 30, the shelter (B) located near an area where the fire occurs, and various movement routes (D) from the location of the wireless terminal unit 30 to the shelter (B). In this case, the main server unit 20 may calculate a value quantified by the fire spread route extraction module 210 for a plurality of compartment areas including sections of movement routes shown in the map image 321, that is, a value obtained by performing an inner product operation on the soil spread potential index and the wind spread potential index, that is, an inner product calculation value. For example, as shown in FIG. 15, the main server unit 20 may calculate the inner product calculation value (C) for a first compartment area (①-①) including the first movement route (D1), calculate the inner product calculation value 'B' for a second compartment area (①-②) including the first movement route (D1), calculate the inner product calculation value 'A' for a third compartment area (①-③) including the first movement route (D1), and calculate the inner product calculation value 'D' for a fourth compartment area (①-④) including the first movement route (D1) and a fifth compartment area (①-⑤) including the first movement route (D1).

The inner product calculation value 'D' may be calculated for the first compartment area (②-①) of the second movement route (D2), the inner product calculation value 'B' may be calculated for the second compartment area (②-②), the inner product calculation value 'A' may be calculated for the third compartment area (②-③) of the second movement route (D2), and the inner product calculation value 'B' may be calculated for the fourth compartment area (②-④). The inner product calculation value 'D' may be calculated for the fifth compartment area (②-⑤). The inner product calculation value 'D' may be calculated for the first compartment area (③-①), the second compartment area (③-②), the third compartment area (③-③), the fourth compartment area (③-④), the fifth compartment area (③-⑤), the sixth compartment area (③-⑥), and the seventh compartment area (③-⑦) of the third movement route (D3). The inner product calculation value 'D' may be calculated for the first compartment area (④-①), the second compartment area (④-②), the third compartment area (④-③), the fourth compartment area (④-④), the fifth compartment area (④-⑤), the sixth compartment area (④-⑥), the seventh compartment area (④-⑦), the eighth compartment area (④-⑧), and the ninth compartment area (④-⑨) of the fourth movement route (D4). Herein, when the calculated inner product value is 'A', it may mean that the risk of wildfire spread is very high, 'B' may mean that the risk of wildfire spread is high, 'C' may mean that the risk of wildfire spread needs attention, and 'D' may mean that the probability of wildfire spread is low.

When the main server unit 20 calculates the inner product value for the compartment areas of the first movement route to fourth movement route, on the basis of this, the movement route whose wind spread potential index is low, that does not overlap with the estimated route (J) generated in the fire spread route extraction module 210, and that has the shortest distance from the wireless terminal unit 30 to the shelter may be detected as the fire avoidance movement route (K) among the plurality of movement routes generated by the movement route generation module 209. And, the detected fire avoidance movement route (K) may be transmitted to the wireless terminal unit 30 and may be displayed on the map image 321 as shown in FIG. 16.

Accordingly, the wildfire detection system 1 may enable the user using the wireless terminal unit 30 to safely reach the shelter along the route displayed on the map image 321.

As such, the wildfire detection system 1 may secure high reliability in detecting flames. Moreover, it is possible to more accurately determine whether there is a fire by extracting information about the temperature, size, and direction of the detected flame. Also the evacuee (L) may not move along the route where the fire spreads, but move along the safe route to the shelter (B) without being involved in a fire accident by calculating the point where the fire spreads at the point where the fire occurs using the wind data (G) obtained from the satellite, the vegetation data (H), and the soil moisture data (I) calculated from the computation module.

Although exemplary embodiments of the present disclosure have been described above with reference to the accompanying drawings, those of ordinary skill in the art to which the present disclosure pertains will understand that the present disclosure may be implemented in other specific forms without changing its technical idea or essential features. Therefore, it should be understood that the exemplary embodiments described above are exemplary and not limited in all respects.

DESCRIPTION OF REFERENCE NUMERALS

1: wildfire detection system
10: camera unit
110: visible image camera module 111: first video image
120: thermal image camera module 121: second video image
20: main server unit
201: object classification extraction module 202: temperature extraction module
203: fire sensing module 204: fire location extraction module
205: notification alarm module 206: shelter location check module
207: variable data receiving module 208: fire spread route extraction module
209: movement route generation module
30: wireless terminal unit
310: message app 320: fire evacuation app
321: map image
A10: first video image A20: second video image
A11: first video extraction flame object A12: first video extraction background object
A21: second video extraction flame object A22: second video extraction background object
A13: first split video image A14: first split part enlargement image
A23: second split video image A24: second split part enlargement image
B: shelter C: current location
D: various movement routes
D1: first movement route D2: second movement route
D3: third movement route D4: fourth movement route
E: fire avoidance movement route F: satellites
G: wind data H: vegetation data
I: soil moisture data J: estimated route
K: fire avoidance movement route

The invention claimed is:
1. A wildfire detection system (1), the system comprising:
a camera unit (10) comprising:
a visible image camera module (110) that photographs a certain area and then generates a first video image (A10), and a thermal image camera module (120) that photographs the same area as the area photographed by the visible image camera module (110) and then generates a second video image (A20), and a main server unit (20) comprising:

an object classification extraction module (201), wherein a pre-set reference flame object is included, the first video image (A10) and the second video image (A20) are received from the camera unit (10), a first video extraction flame object (A11) matching the pre-set reference flame object is detected in the first video image (A10), an area that does not match the reference flame object is detected as a first video extraction background object (A12), a second video extraction flame object (A22) matching the pre-set reference flame object is detected in the second video image (A20), and an area that does not match the reference flame object is detected as a second video extraction background object (A22), a temperature extraction module (202) that extracts a temperature of the second video extraction flame object (A22) at a location that overlaps with the first video extraction flame object (A11) detected in the object classification extraction module (201), a fire sensing module (203) wherein a fire signal is generated when at least one of the temperatures extracted from the temperature extraction module (202) is greater than a pre-set fire reference temperature, and a non-fire signal is generated when a temperature extracted from the first video extraction flame object (A11) and a temperature extracted from the second video extraction flame object (A22) are all less than the fire reference temperature, a fire location extraction module (204) that extracts in the first video image (A10) and in the second video image (A20) a location information of an area where the first video image (A10) and the second video image (A20) are photographed when the fire signal is generated in the fire sensing module (203), a notification alarm module (205) that outputs a pre-set message when the fire signal is generated, and a shelter location check module (206) in which a location information of at least one shelter (B) is pre-stored, further comprising a wireless terminal unit (30) where a fire evacuation app (310) is installed, and that communicates data with the main server unit (20) and receives a message (C) from the notification alarm module (205) of the main server unit (20), wherein the fire evacuation app (310) comprises a map image (321), and when the wireless terminal unit (30) is turned on after receiving the message from the notification alarm module (205), displays on the map image (321) a location of the wireless terminal unit (30) and a location of the shelter received from the shelter location check module (206), wherein the main server unit (20) comprises a computation module (207) that calculates a vegetation data (H) composed of a vegetation index and a canopy temperature by receiving data observed from a satellite (F) while communicating data with the satellite (F) and calculates a soil moisture data (I) by receiving a brightness temperature or a backscattering coefficient observed through a microwave sensor installed in the satellite (F), a variable data receiving module (208) that receives a wind data (G) of a location corresponding to a location information extracted from the fire location extraction module (204) while communicating data with the satellite (F) and receives the vegetation data (H) and the soil moisture data (I) calculated in the computation module (207), a movement route generation module (209) that generates a plurality of routes from the location of the wireless terminal unit (30) to the location of the shelter and transmits the same to the wireless terminal unit (30), and a fire spread route extraction module (210) that extracts an estimated route (J) through which a fire spreads in the fire location extraction module (204) through an inner product calculation value of a soil spread potential index and a wind spread potential index by calculating the soil spread potential index, which indicates a degree of likelihood that the fire of a set section spreads, by inputting the vegetation data (H) received from the computation module (207) and the soil moisture data (I) received from the variable data receiving module (208) into a vegetation data/soil moisture data formula and by calculating the wind spread potential index by performing a vector product operation on the wind data (G) with the location information extracted from the fire location extraction module (204).

2. The system (1) of claim 1, wherein the main server unit (20) detects as a fire avoidance movement route (K) a movement route whose wind spread potential index is small among a plurality of movement routes generated in the movement route generation module (209), that does not overlap with the estimated route (J) generated in the fire spread route extraction module (210), that has the shortest distance from the wireless terminal unit (30) to the shelter, and transmits the same to the wireless terminal unit (30).

* * * * *